(12) United States Patent
Van De Laarschot et al.

(10) Patent No.: US 9,204,596 B2
(45) Date of Patent: Dec. 8, 2015

(54) PLUNGER PRESS AND METHOD FOR PRODUCING COMPRESSED BALES

(75) Inventors: Marijn Van De Laarschot, PK Geldrop (NL); Matthijs Johannes Wondergem, VS Oost-Souburg (NL)

(73) Assignee: KUHN-GELDROP B.V., Geldrop (NL)

( * ) Notice: Subject to any disclaimer, the term of this patent is extended or adjusted under 35 U.S.C. 154(b) by 591 days.

(21) Appl. No.: 13/640,664

(22) PCT Filed: Apr. 14, 2010

(86) PCT No.: PCT/EP2010/002299
§ 371 (c)(1),
(2), (4) Date: Nov. 15, 2012

(87) PCT Pub. No.: WO2011/127944
PCT Pub. Date: Oct. 20, 2011

(65) Prior Publication Data
US 2013/0047867 A1 Feb. 28, 2013

(51) Int. Cl.
*A01F 15/04* (2006.01)
*A01F 15/08* (2006.01)
*B30B 9/30* (2006.01)

(52) U.S. Cl.
CPC ............. *A01F 15/042* (2013.01); *B30B 9/3021* (2013.01)

(58) Field of Classification Search
CPC ............................ A01F 15/042; B30B 9/3021
USPC ............ 100/7, 8, 19 R, 177, 178, 179, 188 R, 100/214, 237, 240, 245, 295; 56/341
See application file for complete search history.

(56) References Cited

U.S. PATENT DOCUMENTS

| | | | |
|---|---|---|---|
| 4,676,153 A * | 6/1987 | Ast | 100/7 |
| 2003/0029330 A1 | 2/2003 | Chassiboud | |
| 2005/0016394 A1* | 1/2005 | McDowell | 100/237 |
| 2010/0107588 A1 | 5/2010 | Lang | |

FOREIGN PATENT DOCUMENTS

| | | | | |
|---|---|---|---|---|
| DE | 384153 C | * | 11/1923 | ............. A01F 15/04 |
| DE | 202 01 417 | | 5/2002 | |
| DE | 20 2009 007 734 | | 8/2009 | |
| EP | 2 181 581 | | 5/2010 | |
| SU | 954255 | | 8/1982 | |

OTHER PUBLICATIONS

International Search Report Issued Mar. 31, 2011 in PCT/EP10/02299 Filed Apr. 14, 2010.

* cited by examiner

*Primary Examiner* — Jimmy T Nguyen
(74) *Attorney, Agent, or Firm* — Oblon, McClelland, Maier & Neustadt, L.L.P.

(57) ABSTRACT

A plunger press produces compressed bales of forage, straw, biomass or fibrous mass for agricultural and/or industrial use. The press includes a bale case, a reciprocating plunger structure, at least one material feeding duct laterally leading into a material charge feeding section of the bale case, and at least one plunger structure drive mechanism. The plunger structure compresses respective material charges fed from the feeding duct into the bale case. The plunger structure is subdivided perpendicularly to a reciprocation direction of the plunger structure in the bale case into at least two structurally separated compression surfaces. Each of the compression surfaces is smaller than a cross-section area of the bale case. The compression surfaces are driven substantially parallelly in the reciprocation direction and with a time shift in relation to each other to alternatingly compress material on partial surfaces of the cross-section area.

15 Claims, 10 Drawing Sheets

PLUNGER PRESS AND METHOD FOR PRODUCING COMPRESSED BALES

BACKGROUND

The invention relates to a plunger press and to a method 15.

The plunger press of U.S. Pat. No. 4,034,543 A is an example of prior art and contains a one piece plunger structure, the active compression surface of which corresponds to the cross-section area of the bale case or the material strand in the bale case. The plunger structure compresses during each compression cycle a material charge against the end surface of the material strand. The material charge is fed laterally from the material feeding duct into the bale case while the plunger structure is retracted and against the end surface of the material strand. The plunger structure is coupled via two crank rods to a crank shaft driven via a clutch from a drive source including a fly wheel. The material charge is fed into the bale case by a pivotable feeding fork such that the material charge already is pre-compressed between the plunger structure and the material strand. Each compression cycle is carried out by the entire compression surface of the plunger structure against the material strand on the entire cross-sectional area of the material strand. After each compression cycle, provided that a predetermined compression degree has been reached, the material strand is shifted further by the plunger structure by a step until after several compression cycles the material strand has reached the predetermined length of a bale which is compressed and then is tied by a tying mechanism and is expelled out of the bale case.

The plunger press of U.S. Pat. No. 4,142,746 A has a one piece plunger structure the compression surface of which corresponds to the entire cross-section area of the material strand. As soon as the compressed material strand has reached its desired length the compressed bale is tied into several loops of a twine material by a dual knot type mechanism.

Baled forage, straw, biomass or fibrous mass for agricultural or industrial use when compressed and tied into a compressed bale is transported over long distances. For efficiency reasons a high bale density or degree of compression of the bale is desirable. To achieve sufficient density in a plunger press having a one piece plunger structure requires extremely high plunger forces and considerable primary energy input. Doubling the density of a bale e.g. requires far more than doubling the plunger structure actuation pressure. Therefore, the plunger structure actuation force and the required primary energy will increase massively. However, the efficiency of the power input of e.g. an open channel baler plunger press is not efficient anyhow because in this type of baler not only is energy needed for compressing the material, but also for stepwise shifting the material strand after fed in material is compressed. The energy input for shifting the material strand does not increase the compression so as a matter of fact means a loss for the baling process. Increasing the bale density not only requires a massive increase of the strength of the design of the drive line, the plunger structure and the bale case with its carrying frame, but also requires to undesirably increase the weight of the plunger press. If a fly wheel is used for energy storage, the fly wheel needs to be massive and heavy. Further, e.g. as in the case of a single knot typing mechanism the binding material has to be pulled through the material strand while the material strand is shifting, the twine material pulling force increases drastically if the plunger structure actuation force is increased. This results in undesirably high twine material stress and an acute danger of twining material breakages.

BRIEF SUMMARY

It is an object of the invention to provide a plunger press the operation of which avoids the above-mentioned drawbacks even when producing high density bales, and to provide a method allowing to produce high density bales but avoiding the above-mentioned drawbacks.

According to the invention the plunger structure is provided with at least two structurally separated compression surfaces each being smaller than the entire bale cross-section area The sum of all partial surfaces corresponds to the cross-section area of the baler. The compression surfaces execute compression cycles with a time shift or phase shift in-between on respective partial surfaces of the bale cross-section area only. With a given plunger structure actuation force and drive line design higher density of the bale is achieved by alternatingly compressing smaller partial surfaces of the material strand with a time shift between compression cycles. By distributing the compression cycles on respective small partial compression surfaces with time shifts the resulting bale density becomes high while the plunger structure actuating force and the required primary energy input remain moderate and the plunger press does not need significant reinforcing measures in terms of the bale case and the carrying frame or the drive train. Even a fly wheel, if provided, does not need to be oversized because in an open channel baler, the required energy for one plunger part for shifting the bale strand only depends on the strand back pressure which for reaching the same density is only part of that of a one piece plunger structure. The sum of the compression surfaces corresponds to the cross-section area of the bale.

The method allows to achieve very high bale density, to operate with moderate twine material pulling forces, and to keep the mechanical load on the acting components moderate, if the final compression or compaction of the bale is built up in several steps with a respective time shift or phase shift between the compression cycles on partial surfaces of the cross-section area each compressing only a partial surface of the cross-section area of the bale smaller than the entire cross-section area of the bale. Over e.g. a 360° revolution of a crank drive mechanism several compression cycles may be carried out for at least one fed-in material charge. However, over e.g. 720° (two revolutions) even more than one material charge could be fed in and compressed in one or more compression cycles of the partial surfaces.

In a preferred embodiment of the plunger press the plunger structure is sub-divided into at least two plunger parts which are actuated structurally separated and with a respective time shift in-between the compression cycles. Each plunger part compresses only a part of the material strand, while another plunger part does not compress at all or does not compress substantially at the same time. The method allows to achieve an optimum high and uniform bale density and offers the advantage of uniformly compressing each material charge differently in at least two compression cycles in the reciprocation directions of the plunger parts.

In a preferred embodiment the plunger structure may be sub-divided into the at least two plunger parts in feeding direction from the material feeding duct into the bale case and/or at least substantially perpendicular to the feeding direction.

Expediently, the plunger drive train comprises a crank mechanism. The plunger parts may share a common crank mechanism. In this case the mechanical load on the crank mechanism remains moderate as predominantly only one plunger part executes its compression cycle while any further plunger part is either totally passive or only executes a slight compression. Alternatively, each plunger part may be coupled to its own crank mechanism facilitating to control the plunger part movements more accurately and even to vary the time shift between the compression cycles upon demand.

In a further expedient embodiment the compression surfaces of the plungers parts are planar and either equally sized or differently sized. In case of differently sized compression surfaces the compression surface next to the or that engages the cross-section first is the largest, so it can take the inertia forces from the shifting of the material strand. As the largest compression surface will produce the strongest linear force on the bale strand, this compression surface can be used to shift the material strand after a compression cycle has been carried out. Any other plunger part having a smaller compression surface is unable to shift the material strands but only executes its compression cycle without shifting the material strand.

Preferably the cross-sectional area of the bale case is rectangular. The compression surfaces of the plunger parts also may be rectangular.

As mentioned, in a preferred embodiment, mainly only one of the plunger parts is used to shift the material strand after a compression cycle. Preferably, this is the plunger part having the largest compression surface, preferably the plunger part located next to the inlet from the feeding duct into the bale case.

In a further embodiment the plunger part being next to the inlet from the feeding duct into the bale case is executing a compression cycle first and in advance of any compression cycle of another plunger part. This assures that the inlet will be reliably closed by the plunger structure when the plunger parts start to execute the compression cycles with a time shift in-between consecutive compression cycles. However, the invention is also contemplating that consecutive compression cycles are carried out with a certain overlap in-between, however, such that only one plunger part produces a maximal compression while any other plunger part either is just starting to compress or is going to be retracted from the material strand already.

In a preferred embodiment at least one of the plunger parts, preferably the plunger part having the largest compression surface, is linearly guided in the bale case, preferably in a carrying frame of the bale case. This does not exclude that all plunger parts are linearly guided in the bale case. However, preferably at least one plunger part may be guided in or at an adjacent plunger part instead, preferably then in or at a plunger part which is stably guided in the bale case.

In a preferred embodiment, and with respect to a 360° revolution of the crank mechanism, the time shift between consecutive compression cycles might correspond to a crank rotation angle range of about 20° to 30°. Such a time shift assures that only one plunger part is operating under full force but that the production rate nevertheless will be kept high.

In a preferred embodiment the respective plunger parts are coupled via at least one crank rod with at least one crank pin of the crank mechanism. Preferably, all crank rods are coupled with the same crank pin. Alternatively, the crank rods may be coupled with different crank pins. The crank rods of the plunger parts may pivot in relation to each other about the crank pin or even may form alternatively a rigid crank rod structure, preferably with crank rods rigidly laterally interconnected by a connecting rod. A rigid crank rod structure offers the advantage that lateral forces on the plunger parts will be avoided to a large extent or will be distributed among the plunger parts.

In a further embodiment there may even be provided a lateral connecting rod between adjacent plunger parts which connecting rod supports the plunger parts in relation to each other.

In a further, preferred, embodiment the plunger parts may have slots for passing at least one binding material needle of a tying mechanism, particularly in an operation phase of the plunger press while one plunger part is executing a compression cycle. The binding material needle, preferably, may be a component of a single knot tying mechanism.

In a preferred embodiment of the method the material strand is shifted respectively only by the operation of one compression surface on a partial surface of the entire cross-section of the material strand, and after a compression cycle first has been executed on this partial surface. The acting compression surface, preferably a compression surface larger than any other compression surface, is first executing the compression cycle counter to the back pressure or shifting resistance of the material strand, and only shifts the material strand over a step after the desired compression or degree of compression has been achieved by the compression cycle. The other compression surfaces are unable to overcome the back pressure but only execute compression cycles without shifting the material strand. However, the invention is not limited to this particular method variant, but also contemplates that even also another compression surface may shift the material strand.

According to another variant of the method a material charge is fed from the material duct into the bale case prior to the execution of compression cycles. The fed-in material charge is then sub-divided in as many partial charges as compression surfaces are provided. The sub-divided partial charges are then compressed consecutively and more uniformly, preferably even in overlapping fashion into the material strand.

In order to increase the final density of the bale it might be expedient to already pre-compress the material charge fed into the bale case prior to any compression cycle between the compression surfaces and the material strand already by the feeding process, preferably by feeding the material charge with a feeding fork which temporarily even engages into the bale case while the compression surfaces still are distant from the material strand.

Expediently, a compression cycle is executed in the material strand on a partial surface while no or no substantial compression is carried out on another partial surface. Alternatively, the compression cycle may take place on a partial surface while no further or no further substantial compression is taking place on another partial surface.

Preferably a material charge is fed into the bale case while the compression surfaces keep the largest possible or almost the largest possible distance from the material strand.

BRIEF DESCRIPTION OF THE DRAWINGS

As an example exemplary embodiments of the invention will be explained with the help of the drawings. In the drawings is.

DETAILED DESCRIPTION

FIGS. 1 to 4 illustrate different operational phases of producing compressed bales for agricultural and/or industrial use e.g. of forage, straw, biomass or fibrous mass, in a plunger press P, being part of one open channel baler (not shown). The plunger press P has, as is conventional, a frame (not shown) encasing a bale case 1, the frame being arranged on a mobile undercarriage which is either self-propelled or is towed via a tongue coupled to a hitching device of a towing vehicle. The plunger press P is either equipped with its own drive source like a combustion engine or is supplied e.g. with e.g. hydraulic power from the towing vehicle. Alternatively, the plunger press P may be integrated into a press box baler.

Figure 1:
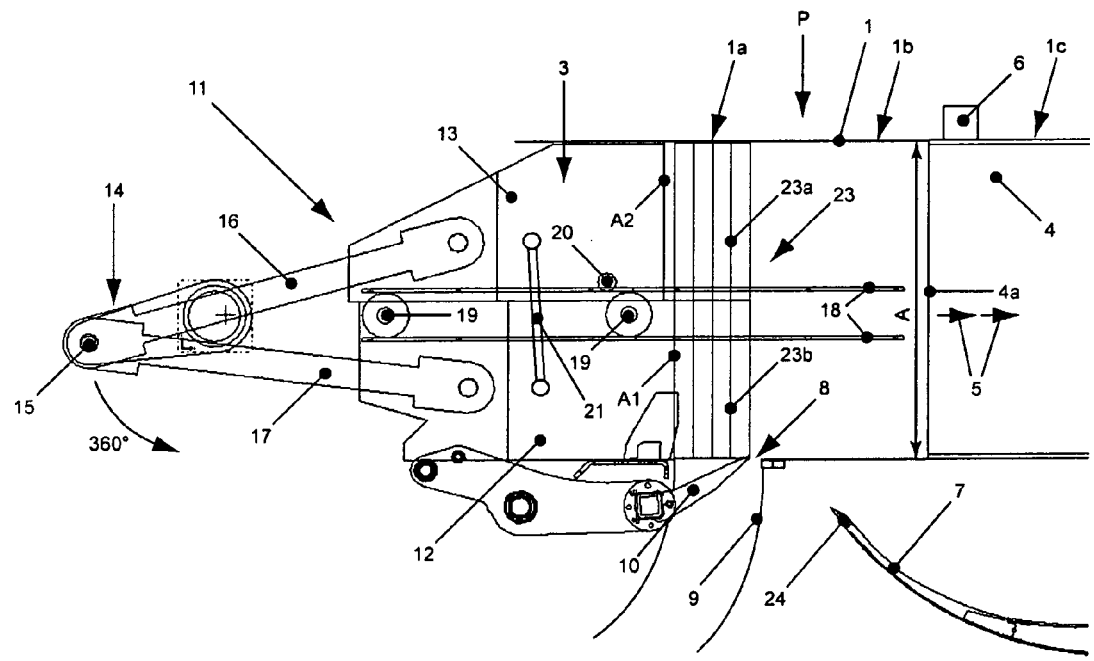
FIG. 1 a schematic side view of main components of an embodiment of a plunger press in a first operation phase, e.g. of an open channel baler, FIG. 2 a schematic side view of the plunger press in yet another operation phase after a strand shifting step, FIG. 3 a schematic side view of the plunger press in a further operation phase, FIG. 4 a schematic side view of the plunger press in yet another operation phase, FIG. 5 a schematic side view of another embodiment of a plunger press in an operation phase analogously to the operation phase shown in FIG. 1, FIG. 6 a schematic side view of the plunger press in an operation phase analogously to the operation phase shown in FIG. 2, FIG. 7 a schematic side view of the plunger press of FIG. 5 in yet another operation phase prior to a strand shifting step, FIG. 8 a schematic side view of the plunger press of FIG. 5 in yet another operation phase analogously to the operation phase shown in FIG. 3, FIG. 9 a schematic side view of yet another embodiment of a plunger press, and FIG. 10 a perspective view of the embodiment of FIGS. 1 to 4 in another operation phase.

A material feeding duct 9 is connected to the bale case 1, in particular to a lower side (inlet 8) of a material charge feeding section 1a which is continued in the bale case 1 to the right side in FIG. 1 by a compression section 1b and a material strand channel section 1c. The material feeding duct 9 is connected to a not shown pick-up device comprising conveying means for transferring picked-up material from the ground towards the region of the material duct 9 close to the inlet 8, where a feeding fork 10 e.g. pivotally operates to feed a respective material charge into the material feeding section 1a of the bale case. A drive train (not shown in detail) of the plunger press P is connected to the respective movable components of the plunger press and controls, e.g. via a not shown clutch mechanism, speed, direction and timing of the movements of the components.

The bale case 1 contains in a compartment 3 a plunger structure 11 which is connected in the shown embodiment to drive mechanism 14, e.g. a crank mechanism, i.e. in the embodiment to a crankshaft having at least one crank pin 15. The plunger structure 11 is driven reciprocatingly for two reasons, namely to compress the material in the bale case 1, and to form a compressed material strand 4 in the material strand channel section 1c and to open and close the inlet 8. The material strand 4 is shifted stepwise as indicated by arrows 5 along the material strand channel section 1c until a predetermined length of a bale is reached which is then tied into binding material 24 by a tying mechanism 6 and a respective binding material needle 7 before the bound bale is expelled. Of course, there is a series of parallel binding material needles 7 providing binding material 24 to the tying mechanism 6 which in this case may form a single knot in a binding material loop. Also, the feeder fork 10 has a series of tines. The plunger structure 11 is formed with longitudinal slots 29 (see FIG. 10) facilitating the passage of each binding material needle 7 and, in certain operation phases, the passage of the tines of the feeding fork 10 through bale case 1.

According to the invention, the plunger structure 11 has at least two compression surfaces A1, A2 (even three or four compression surfaces, not shown) each for compressing a respective partial charge 23a, 23b of a material charge 23 fed into the bale case 1 and a time shift in-between consecutive compression cycles. In the embodiment shown, the bale case cross-section is rectangular or square and has a cross-section area A. Each compression surface A1, A2 is substantially planar and rectangular or square as well, however, has a smaller size than the bale cross-section area A.

The plunger structure 11, in the shown embodiment, consists of at least two structurally separated plunger parts 12, 13 accommodated in the bale case 1 and reciprocatingly driven such that the compression surfaces A1, A2 provided on the plunger parts 12, 13 execute compression cycles on the material strand 4 (in particular at the rear end 4a of the material strand 4) with a time shift between consecutive compression cycles, or with some overlap between consecutive compression cycles such that only one compression surface A1 or A2 is executing a full compression, while the other compression surface does not execute a full compression, i.e. but either approaches or leaves the material strand 4.

In the embodiment shown plunger part 12 is situated adjacent to the inlet 8 and may have a larger compression surface A1 than the compression surface A2 of the plunger part 13 which is located in feeding direction into the bale case 1 above plunger part 12. Compression surface A2 thus is smaller than compression surface A1. Alternatively, all compression surfaces A1, A2 provided may have equal sizes. In the case of e.g. three or more compression surfaces on structurally separated plunger parts the plunger part situated adjacent to the inlet 9 may have the largest compression surface A1, while all other compression surfaces may have the same smaller size among themselves or even differently sized compression surfaces. Further, alternatively, the plunger structure 11 could be subdivided into two or more plunger parts crosswise to the feeding direction from the feeding duct 9 into the bale case 1 (not shown).

In the embodiment shown the plunger structure 11 is driven by a common drive mechanism 14, e.g. via crank rods 17, 16 of the crank mechanism shown. The crank rods 16, 17 are coupled with both plunger parts 12, 13 at one end and to a common crank pin 15 of the crank mechanism 14 at the other end. In a not shown embodiment, the crank mechanism 14 could have e.g. a number of crank pins 15 corresponding to the number of plunger parts but offset in relation to each other in the direction of rotation of the crank mechanism 14, with at least two plunger parts being connected via their crank rods 17, 16 to different crank pins.

Instead of a crank mechanism 14, driven in the embodiment by the drive train of the plunger press P via a shiftable clutch and e.g. a fly wheel (not shown) other types of reciprocating drive mechanisms could be provided, e.g. hydraulic cylinders or the like for reciprocatingly driving the plunger parts 12, 13 in controlled fashion.

Figure 9:
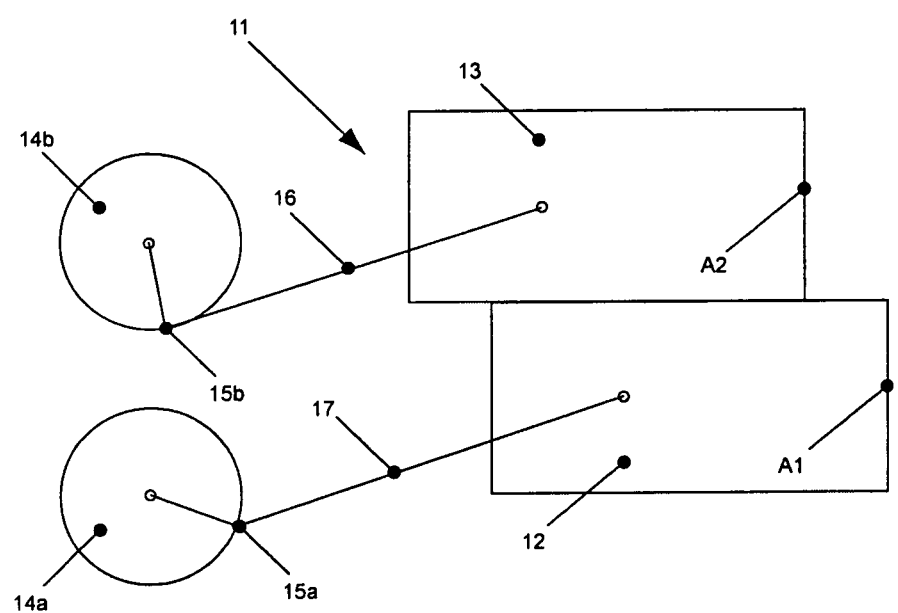

FIG. 9 e.g. illustrates that the plunger parts 12, 13 are associated to separate crank mechanism 14a, 14b and are coupled with a respective crank pin 15a, 15b via a crank rod 16, 17.

As an optional feature shown in FIG. 1, the plunger parts 12, 13, or adjacent plunger parts of the plunger structure 11, respectively, may be supported in relation to each other and crosswise to the reciprocating direction by at least one connecting rod 21.

Each plunger part 12, 13 may be linearly guided in the bale case 1 or a respective, not shown, at a carrying frame of the bale case 1. However, in the embodiment shown in FIG. 1, only the lower plunger part 12 is linearly guided in the bale case 1 by e.g. a plurality of guiding members 19 sliding in guiding rails 18. The upper plunger part 13 is guided at the lower plunger part 12, e.g. by at least one guiding member 20 of the lower plunger part 12 engaging into the upper plunger part 13. In the embodiment of FIG. 1, the crank rods 17, 16 sharing a common crank pin 15 are pivotable in relation to each other about the axis of the crank pin 15 upon the reciprocating movements of the plunger parts 12, 13. The axis of the crank mechanism 14 is located such that the plunger parts 12, 13 are executing respective compression cycles (compression cycle of the compression surface A1 in FIG. 3; compression cycles of the compression surface A2 in FIG. 4) with a time shift T in-between, e.g. corresponding to a rotary angle range of about 20° to 30° of a full 360° revolution of the crank mechanism 14.

In the operation phase shown in FIG. 1, a material strand 4 of compressed material is already present in the material strand channel section 1c facing with the rear end 4a towards the plunger structure 11. The plunger parts 12, 13 are in retracted positions, e.g. with a small offset in linear reciprocating direction between the compression surfaces A1, A2. The end 4a of the material strand 4 remains at a certain position within the material strand channel section 1c. This position is fixed by friction of the compressed material strand 4 and/or by not shown structural means. The needle 7 is in a retracted position. The feeding fork has just fed a material charge 23 through the inlet 9 into the material feeding section 1a of the bale case 1.

Although FIG. 1 shows a distance between the material charge 23 and the end 4a, in an alternative embodiment, not shown, the material charge 23 could become pre-compressed by virtue of the feeding action of the feeding fork 10 between the plunger structure 11 and the end 4a of the material strand 4. The tip regions of the tines of the feeding fork 10 may even engage into the slots of the plunger structure 11, or the plunger part 12 respectively, which the feeding fork 10 passes through.

Upon continuation of the rotation of the crank mechanism 14 both plunger parts 12, 13 are driven towards the end 4a, e.g. such that the fed-in material charge 23 is sub-divided into the two partial charges 23a, 23b. The feeding fork 10 then might be pivoted downwardly out of the bale case 1.

Figure 2:
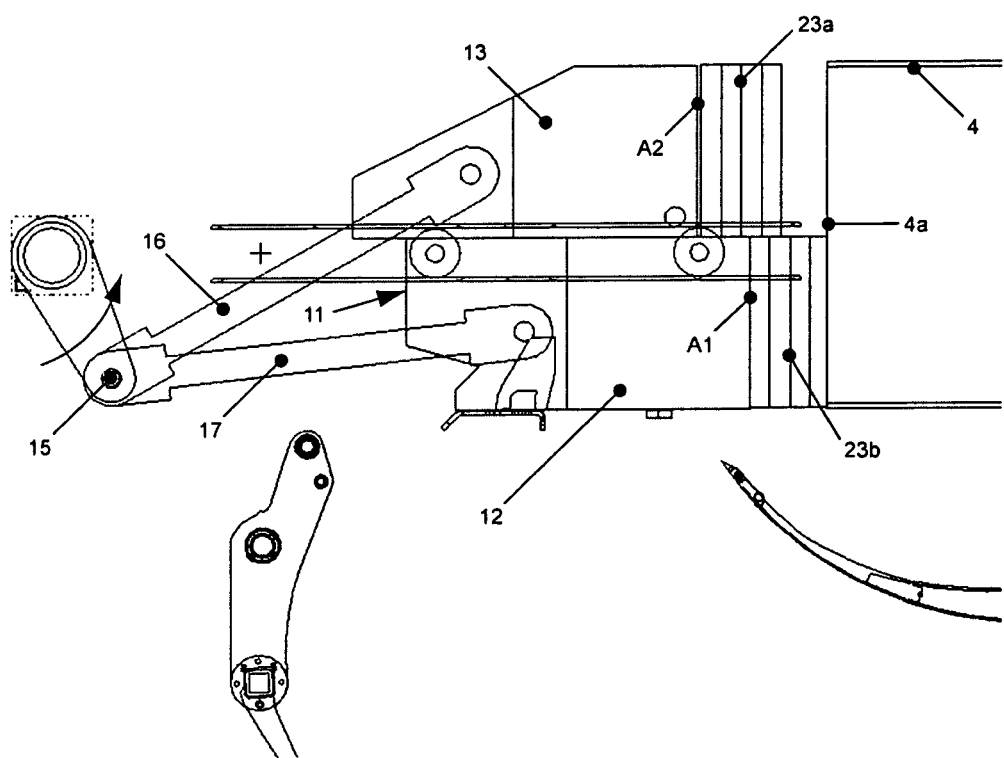

In the operation phase shown in FIG. 2 the plunger structure 11 is driven such that the partial charge 23b just reaches the end 4a by the movement of the lower plunger part 12, while the upper plunger part 13 is trailing such that the partial charge 23a has not yet reached the end 4a. This is an operational phase where the compression surface A1 starts to execute the compression cycle of the partial charge 23b (FIG. 2).

Figure 3:
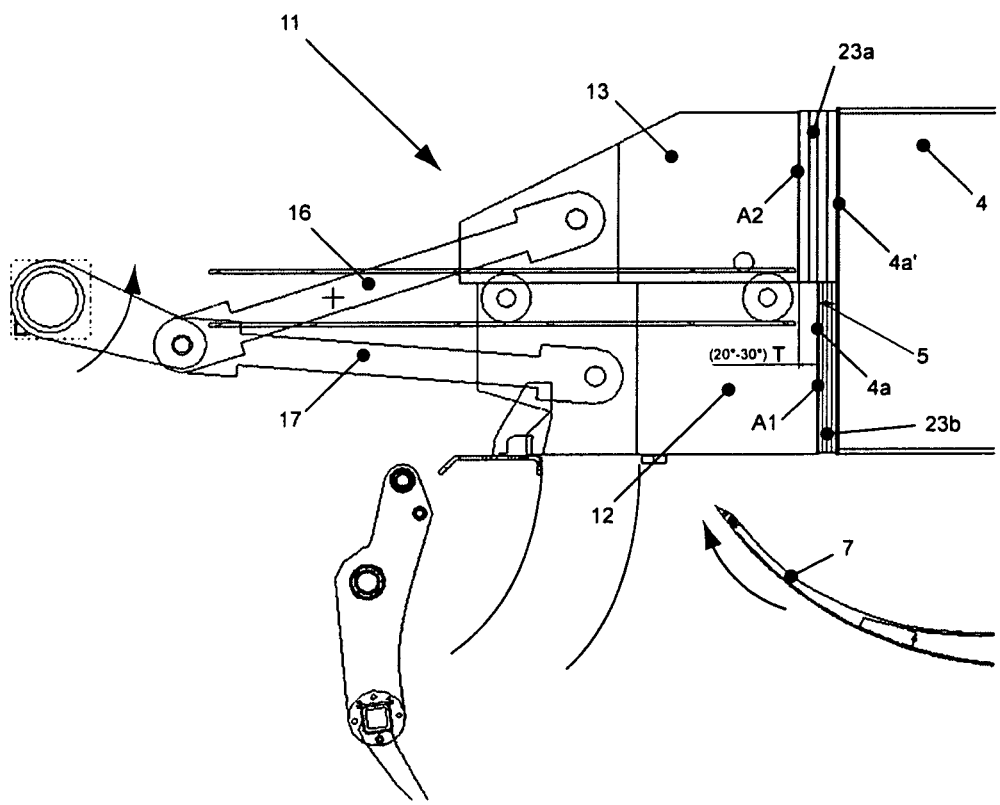

In the next operational phase shown in FIG. 3 the compression surface A1 has executed a compression cycle and has compressed the partial charge 23b to a predetermined density or degree of compression, while the compression surface A2 is still trailing. As soon as the degree of compression has reached a predetermined value, sufficiently high to overcome the back pressure of the material strand 4, in the end phase of the compression cycle the compressed partial charge 23b shifts the material strand 4 such that the position of the end 4a reaches a position 4a'. The other compression surface A2 now already has started a compression cycle then, however, such that the degree of compression in the partial charge 23a is still smaller than in the partial charge 23b.

Figure 4:
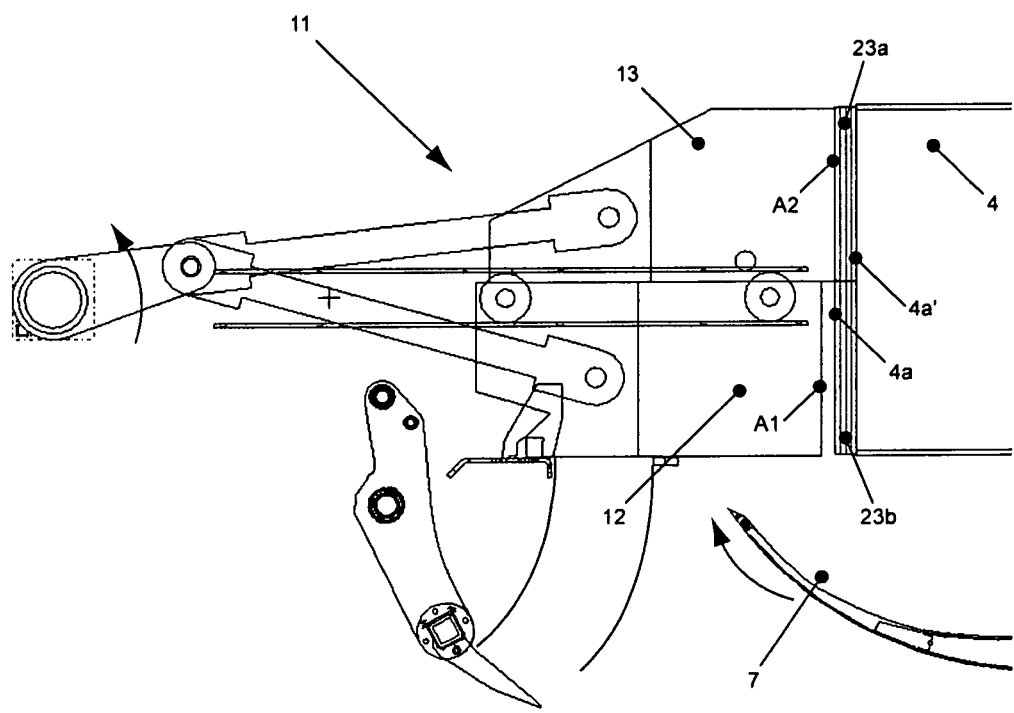

In the next operational phase shown in FIG. 4, the compression surface A1 has already yielded somewhat to the left, while the compression surface A2 has finished its compression cycle of the partial charge 23a against the end 4a positioned at position 4a'. In or after this operation phase the twine material needle 17 may be moved through the slots 29 in the plunger structure 11 upwardly to feed twining material 24 to the tying mechanism 6 (in this case forming a single knot).

After the operation phase in FIG. 4 the plunger structure 11 will be withdrawn from the material strand 4 until the position shown in FIG. 1 is achieved again.

FIGS. 5 to 8 relate to similar operational phases as shown in FIGS. 1 to 4 (e.g. in FIG. 7 a phase prior to a strand shifting step) in another embodiment of a plunger press P. In order to reduce lateral forces on mainly the plunger part 12 caused by the crank rod 17, both plunger rods 16, 17 (there may be provided several plunger rods 16, 17 along the crank mechanism 14) in this embodiment are interconnected by a cross rod 25 e.g. interconnecting the linking points of both crank rods 17, 16 in the plunger parts 12, 13. This results in a rigid crank rod structure 27. The plunger part 12, the compression surface A2 of which may be larger than the compression surface A1 of the plunger part 13, is linearly guided e.g. by the guiding elements 19 in the guiding rails 18 in the bale case 1 or the not shown exterior frame of the plunger press. The plunger part 13 is supported at guiding element 20 fixed to plunger part 12 (or alternatively fixed to both sides of the bale case 1 or the exterior bale case frame) guiding element 20 engages into an arcuate guiding slot 28 provided at or in the plunger part 13. Owing to the rigid crank rod structure 27 constituted by crank rods 16, 17 and cross rod 25, plunger part 13 executes slight oscillating movements in the direction of a double arrow 26 about the guiding axis defined by guiding element 20 and in relation to the strictly linearly guided plunger part 12.

In the embodiment of FIG. 9 already described earlier, the time shift T between compression cycles of the compression surfaces A1, A2 may be varied upon demand, e.g. by changing the rotary offset between the two structurally separated crank mechanisms 14a, 14b. Both crank mechanisms 14a, 14b may be driven in synchronism via a common drive train.

In not shown alternative embodiment of such a plunger presses P the plunger structure 11 could even be formed with three or more structurally separated compression surfaces or plunger parts, respectively, each compression surface executing a compression cycle while another one has just ended a compression cycle or is going to start a compression cycle.

Over a 360° revolution of the crank pin 15 at least two compression cycles may be carried out with one fed-in material charge 23. However, over e.g. 720° (two revolutions) more than one material charge 23 may be fed in and compressed in e.g. at least one compression cycle per partial surface.

The method carried out in the plunger presses P of e.g. FIGS. 1 to 10 e.g. is executed in an open channel baler as follows:

While the plunger parts 12, 13 are driven e.g. by a common crank mechanism 14 they compress the material or phase shift with a time shift T in-between. At least one material charge 23 is fed-in in front of the plunger structure 11 when the plunger parts 12, 13 both are situated either at or near the most backward positions. The material charge 23 may even be pre-compressed by the feeding process before the material charge 23 is compressed in partial charges 23a, 23b against the already compressed material strand 4. When the plunger parts 12, 13 both move towards the material strand end 4a first the lower plunger part 12 or the plunger part having the larger compression surface A1, will execute a full compression cycle while the crank mechanism 14 continues to rotate. The partial material charge 23b will be compressed until the maximum compression ratio or degree of compression reaches the back pressure of the material strand 4. As the compression surface A1 of the plunger part 12 is about only half of the entire cross-sectional area A of the material strand 4, the compression or degree of compression will be doubled (with the same back pressure) compared to the compression achieved by a plunger structure having a single compression surface equal to the cross-section area A. This means that the design of the drive train and the material strand shifting channel only needs to have half of the strength of a one piece plunger structure design. During the initial compression cycle of compression surface A1 the degree of compression overcomes the back pressure of the material strand 4. The material strand then will be shifted by one step 5 until the compression surface A1 of the plunger part 12 reaches its end position (position 4a), e.g. corresponding to a 255° position of the crank pin 15. Because the material strand 4 is shifted only by half of the usual force, the energy needed for this shifting step of the material strand may be only half of the energy needed to shift the material strand by a one piece plunger structure, in order to reach the same bale density.

When the material strand 4 has been shifted by one step (new position 4a' of end 4a) the next plunger part 13 executes its compression cycle of the other partial charge 23a against the upper partial surface of the cross-sectional area A of the material strand end 4a. At the same time the plunger part 12 retracts from position 4a' and no longer exerts significant force on the material strand 4. The partial charge 23a will be fully compressed when the plunger part 13 has reached its end position (e.g. at a rotational angle of about 285° of the crank pin 15). The material strand 4 will not necessarily be shifted by the action of plunger part 13 because the material strand 4 had already been shifted earlier by the compression cycle of plunger part 12 and because compression surface A2 is smaller than A1. Even two or more material charges 23 could be fed in and commonly finally compressed over two revolutions of the crank pin 15. As the material strand 4 was shifted by plunger part 12 by about half of the force generated by a one piece plunger structure, the bale case 1 may have less strength. If a fly wheel is used in the drive train, the energy stored in the fly wheel can be much less. Also the torque needed for actuating first the plunger part 12 and then the trailing plunger part 13 during the compression cycles may be less. The torque exerted by the crank mechanism 14 may even be applied over a wider rotary angle range such that a provided gear box may be used more efficiently. As a further positive result the binding material 24 can be pulled through easier because then the back pressure is lower meaning that the pulling friction on the binding material is lower.

To reduce the strength of the overall design of the plunger press P the plunger structure 11 could even be sub-divided in three or more plunger parts in order to achieve a triple or even further multiple density in the final bale.

In the embodiments shown the plunger structure 11 is sub-divided in the feeding direction from the material feeding duct 9 into the bale case 1. However, alternatively or additively the plunger structure 11 may be sub-divided in a direction at least substantially perpendicular to the drawing plane.

Figure 5:
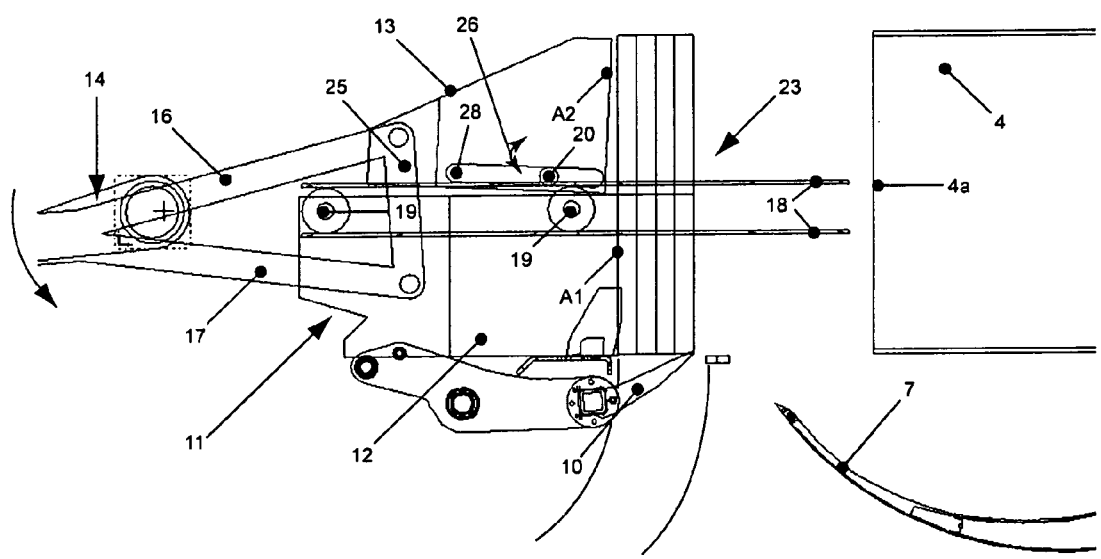
Figure 6:
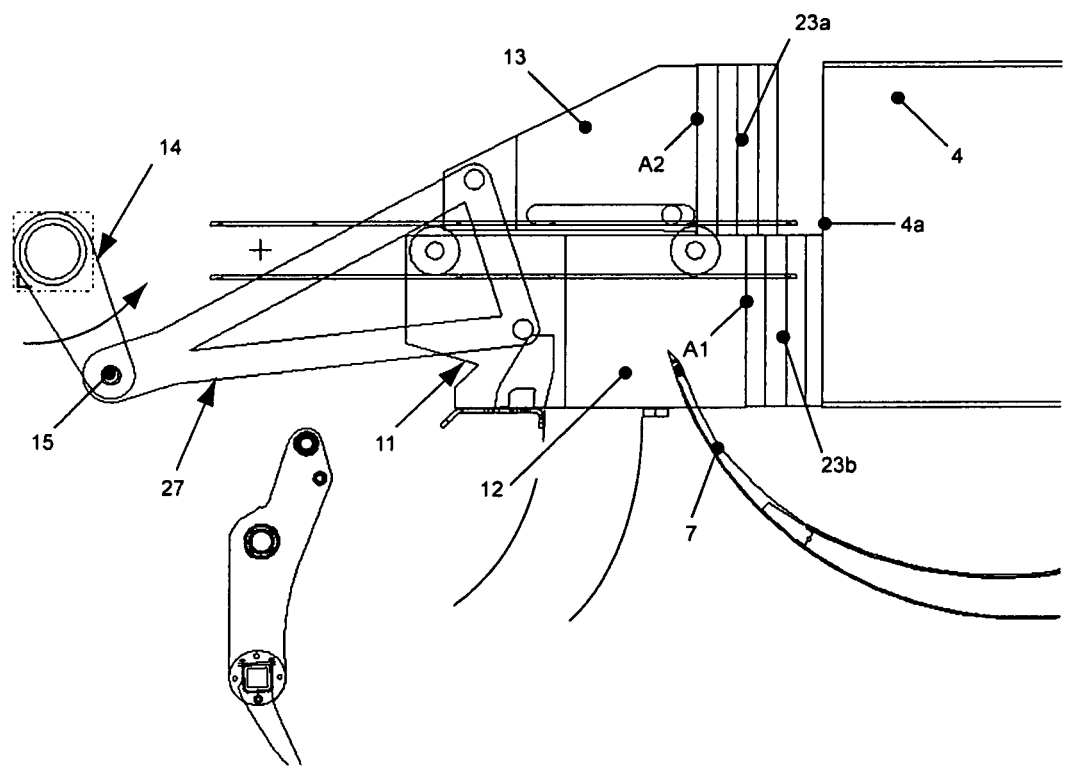
Figure 7:
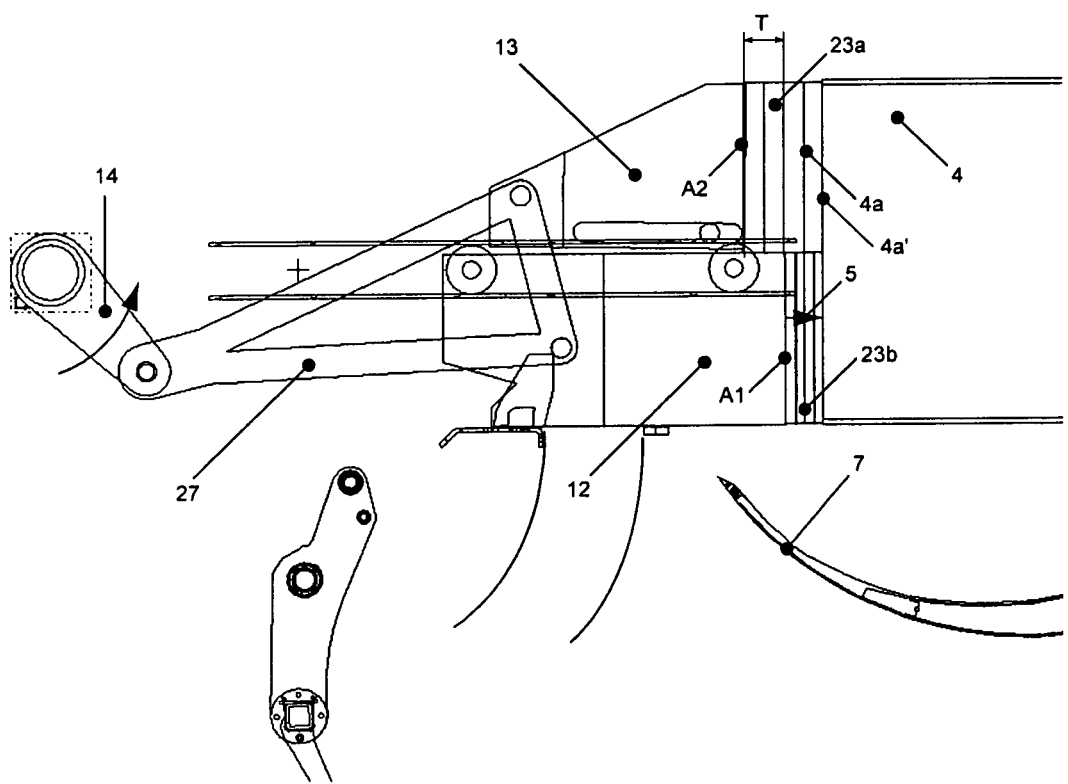
Figure 8:
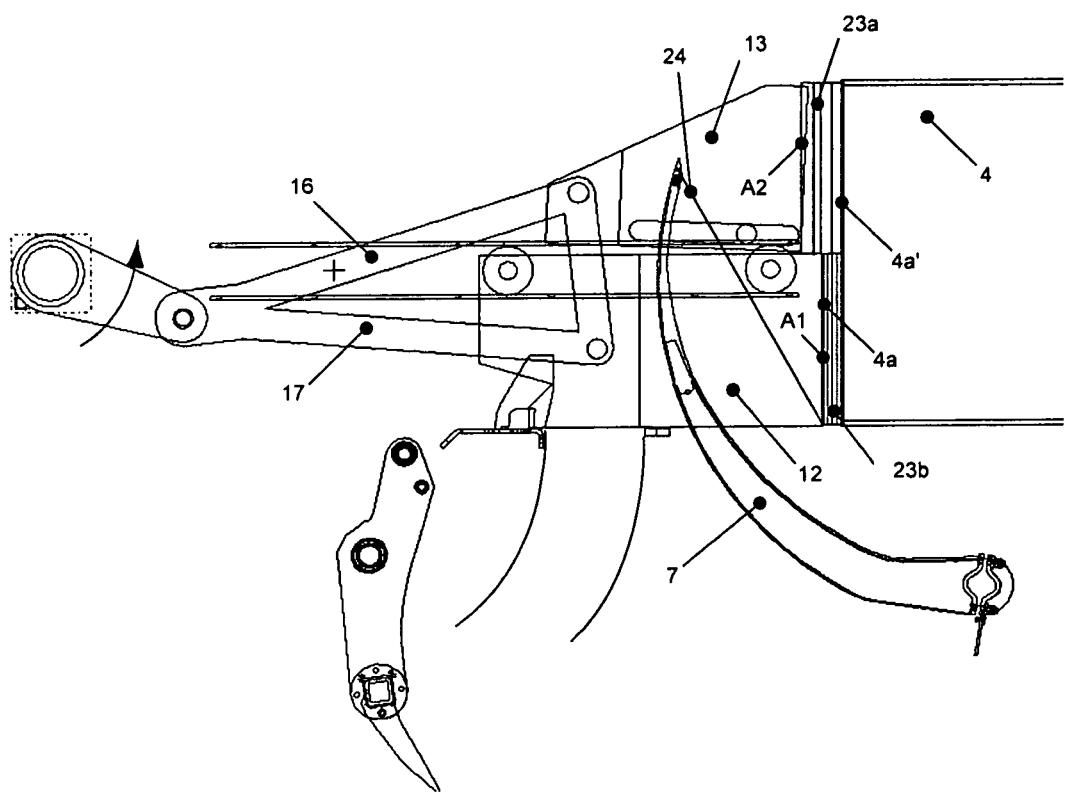
Figure 10:
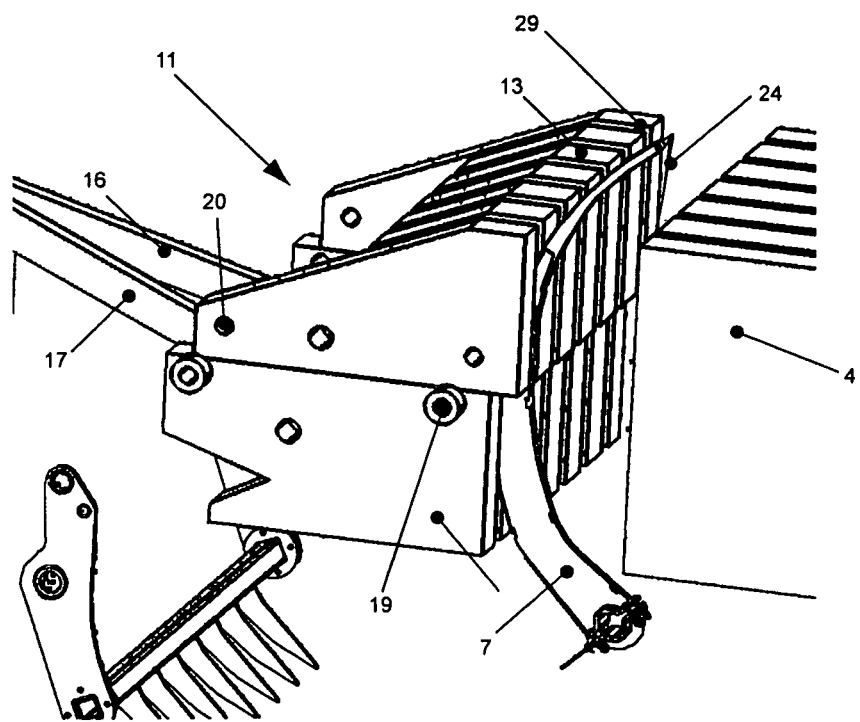

FIG. 10 illustrates the somewhat offset plunger parts 12, 13 of FIG. 1 or FIG. 5 distant from the material strand 4, while the feeding fork 10 is in a stand-by position and each needle 7 is on its way to the tying system 6 and partially passes through the slots 29.

An important aspect of he invention is that assuming a given cross-section A and a certain back pressure of the material strand 4 the compression of the respective material is easily and markedly increased by compressing only a partial surface of the cross-section area A until e.g. the back pressure of the material is overcome to shift the material strand 4 by one step, e.g. in an open channel baler. This is achieved by a somewhat equal force on the respective plunger part 12, 13, and does not need to significantly strengthen the plunger press structure and/or the drive train. A decreased compression surface increases the compression generated by the plunger part and increases the overall bale density.

The invention claimed is:

1. A plunger press for producing compressed bales of forage, straw, biomass or fibrous mass for agricultural and/or industrial use, comprising:
   a bale case;
   an at least substantial linearly reciprocating plunger structure;
   at least one material feeding duct laterally leading into a material charge feeding section of the bale case; and
   at least one plunger structure drive mechanism driven by a drive source, the plunger structure compressing respective material charges fed from the feeding duct into the bale case,
   wherein the plunger structure is subdivided perpendicularly to a reciprocation direction of the plunger structure in the bale case into at least two structurally separated compression surfaces,
   wherein each of the compression surfaces is smaller than a cross-section area of the bale case, and
   wherein the compression surfaces are separately alternatingly driven substantially parallelly in the reciprocation direction and with a time shift in relation to each other to alternatingly compress material on partial surfaces of the cross-section area.

2. The plunger press as in claim 1, wherein the plunger structure is sub-divided perpendicularly to the reciprocation direction extending substantially linerally into structurally separated plunger parts each having a respective one of the compression surfaces.

3. The plunger press as in claim 2, wherein the plunger structure is sub-divided into the structurally separated plunger parts in a feeding direction or perpendicularly to a feeding direction from the feeding duct into the bale case.

4. The plunger press as in claim 1, wherein the plunger structure drive mechanism comprises at least one crank mechanism or a hydraulic cylinder, and the compression surfaces either share a common drive mechanism or are coupled to separate drive mechanisms.

5. The plunger press as in claim 1, wherein the cross-section area of the bale case is rectangular, and the compression surfaces are rectangular or square.

6. The plunger press as in claim 1, wherein a largest one of the compression surfaces is driven to compress first and to shift a strand of the material in one step along the bale case.

7. The plunger press as in claim 4, wherein a plunger part having one of the compression surfaces and being situated next to the material feeding duct executes first at least one compression cycle with the time shift in advance to any other plunger part.

8. The plunger press as in claim 2, wherein at least one of the plunger, parts is linearly guided in the bale case.

9. The plunger press as in claim 2, wherein one of the plunger parts is guided in or at an adjacent one of the plunger parts being linearly guided in the bale case.

10. The plunger press as in claim 1, wherein with respect to a 360° revolution of a crank mechanism of the plunger structure drive mechanism, the time shift corresponds to a crank rotation angle range of about 20° to 30°.

11. The plunger press as in claim 4, wherein each of the plunger parts is coupled via a crank rod to one crank pin of the crank mechanism, and the crank rods either are pivotable in relation to each other about the crank pin or are formed as a rigid crank rod structure including at least one connection rod.

12. The plunger press as in claim 2, wherein adjacent plunger parts are supported in relation to each other via at least one at lateral cross rod.

13. A method for producing compressed bales of a compressible forage, straw, biomass or fibrous mass material in a plunger press comprising:
  compressing, via a reciprocating driven plunger structure, the material in a bale case alternatingly on partial surfaces of a cross-section area of the bale, wherein the plunger structure is subdivided perpendicularly to a reciprocation direction of the plunger structure in the bale case into at least two structurally separated compression surfaces, wherein each of the compression surfaces is smaller than a cross-section area of the bale case, and wherein the material is compressed alternatingly on the partial surfaces of the cross-section area by separately alternatingly driving the structurally separated compression surfaces of the plunger structure.

14. The method as in claim 13, further comprising:
  shifting the material in the plunger press of an open channel baler after a compression cycle carried out on only one partial surface; and
  keeping the material stationary in the plunger press during any further compression cycle on another partial surface of the cross-section area.

15. The method as in claim 13, further comprising:
  feeding, prior to a compression cycle, a material charge into a material feed section of the plunger press;
  dividing the material charge into partial charges by the structurally separate compression surfaces; and
  compressing the partial charges separately with a time shift between consecutive compression cycles of the partial charges.

* * * * *